(12) United States Patent
Ban et al.

(10) Patent No.: US 12,281,684 B2
(45) Date of Patent: Apr. 22, 2025

(54) FLYWHEEL HOUSING AND ENGINE EQUIPPED WITH FLYWHEEL HOUSING

(71) Applicant: KUBOTA CORPORATION, Osaka (JP)

(72) Inventors: Mariko Ban, Sakai (JP); Yuichi Tamaki, Sakai (JP); Tomohiro Sato, Sakai (JP); Masato Ueda, Sakai (JP); Noriyoshi Eguchi, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/491,012

(22) Filed: Oct. 20, 2023

(65) Prior Publication Data

US 2024/0200633 A1 Jun. 20, 2024

(30) Foreign Application Priority Data

Dec. 19, 2022 (JP) .................................. 2022-202090
Dec. 19, 2022 (JP) .................................. 2022-202092

(51) Int. Cl.
*F16F 15/31* (2006.01)
*F16F 15/14* (2006.01)
*F16F 15/315* (2006.01)

(52) U.S. Cl.
CPC ............ *F16F 15/315* (2013.01); *F16F 15/14* (2013.01)

(58) Field of Classification Search
CPC ... F16F 15/315; F16F 15/30–34; F16M 1/026
See application file for complete search history.

(56) References Cited

U.S. PATENT DOCUMENTS 4,346,624 A * 8/1982 Nagasaki .............. F16F 15/315
475/159

FOREIGN PATENT DOCUMENTS

| CN | 201706143 U | * | 1/2011 | ............. F16M 1/026 |
| JP | H045699 Y2 | * | 2/1992 | ............. F02B 77/00 |
| JP | 2013-076266 A | | 4/2013 | |

OTHER PUBLICATIONS

Machine translation of JPH045699Y2, obtained from fit database (Year: 1992).*

* cited by examiner

*Primary Examiner* — Thomas C Diaz
(74) *Attorney, Agent, or Firm* — Muncy, Geissler, Olds & Lowe, P.C.

(57) ABSTRACT

A flywheel housing 100 includes: a main body portion 110 which is arranged on a side of an engine 1 of a flywheel 20 and which has a housing portion 111 that houses the flywheel 20; and a cover portion 120 which is arranged on an opposite side of the flywheel 20 to the engine 1, and which is connected to the main body portion 110, and moreover which has an opening portion 125 with an inner diameter that is smaller than an outer diameter of the flywheel 20, wherein the cover portion 120 is provided with a recessed portion 123 that is recessed in a direction of separation from the flywheel 20 on an opposing surface 122b to the flywheel 20 in a peripheral portion of an edge of the opening portion 125.

16 Claims, 10 Drawing Sheets

FLYWHEEL HOUSING AND ENGINE EQUIPPED WITH FLYWHEEL HOUSING

BACKGROUND OF THE INVENTION

1. Field of the Invention

The present invention relates to a flywheel housing that houses a flywheel coupled to an output shaft of an engine and to an engine equipped with the flywheel housing.

2. Description of the Related Art

A flywheel is coupled to a crankshaft that is one of output shafts of an engine and contributes to smooth rotation of the engine. The flywheel is housed in a flywheel housing that is provided in an engine block.

Japanese Patent Application Publication No. 2013-076266 discloses an engine that is equipped with a flywheel housing, a flywheel, and a flywheel cover on a rear-side end of an engine. In the engine, the flywheel housing has, on an end surface thereof, a circular opening and the opening is closed by the flywheel cover. The flywheel is housed in the flywheel housing. The flywheel cover is provided with a through-hole and a torque of the engine can be extracted via the through-hole.

SUMMARY OF THE INVENTION

The flywheel housing is configured to cover an outer side of the flywheel. Therefore, increasing a size of the flywheel housing results in increasing a size of the entire engine. On the other hand, when the size of the flywheel housing is reduced, since a spacing between the flywheel housing and the flywheel decreases, a decline in workability during assembly and testing of the engine is desirably prevented. In addition, having the flywheel housing additionally perform functions other than the function of housing the flywheel is important in terms of space-saving in the engine.

The present invention has been made in consideration of the circumstances described above and an object thereof is to provide a flywheel housing capable of suppressing an increase in size of an engine and increasing workability and an engine equipped with the flywheel housing.

A first aspect of the present invention is a flywheel housing that houses a flywheel coupled to an output shaft of an engine, the flywheel housing including: a main body portion which is arranged on the engine side of the flywheel and which has a housing portion that houses the flywheel; and a cover portion which is arranged on an opposite side of the flywheel to the engine, and which is connected to the main body portion, and moreover which has an opening portion with an inner diameter that is smaller than an outer diameter of the flywheel, wherein the cover portion is provided with a recessed portion that is recessed in a direction of separation from the flywheel on an opposing surface to the flywheel in a peripheral portion of an edge of the opening portion.

According to the first aspect of the present invention, since the recessed portion is provided on an opposing surface to the flywheel in a peripheral portion of an edge of the opening portion of the cover portion, a gap is formed between the cover portion and the flywheel in the peripheral portion of the edge of the opening portion and workability is improved by the gap.

A second aspect of the present invention is the flywheel housing according to the first aspect of the present invention, wherein the edge of the opening portion is positioned on a bottom surface of the recessed portion.

According to the second aspect of the present invention, since the edge of the opening portion is positioned on the bottom surface of the recessed portion, the edge of the opening portion becomes continuous to the bottom of the recessed portion and access from the edge of the opening portion to the opposing surface to the flywheel of the cover portion becomes easier.

A third aspect of the present invention is the flywheel housing according to the first or second aspect of the present invention, wherein a curved surface is provided between a side surface and the bottom surface of the recessed portion.

According to the third aspect of the present invention, since a surface between the side surface and the bottom surface of the recessed portion is a curved surface, a worker can more readily touch a surface of the recessed portion when placing a hand in the recessed portion.

A fourth aspect of the present invention is the flywheel housing according to any one of the first to third aspects of the present invention, wherein a curved surface is provided between adjacent side surfaces of the recessed portion.

According to the fourth aspect of the present invention, since a surface between adjacent side surfaces of the recessed portion is a curved surface, a worker can more readily touch a surface of the recessed portion when placing a hand in the recessed portion.

A fifth aspect of the present invention is the flywheel housing according to any one of the first to fourth aspects of the present invention, wherein the opposing surface is provided with a plurality of the recessed portions on a circumference in a periphery of the opening portion and a rib is provided between the plurality of adjacent recessed portions.

According to the fifth aspect of the present invention, even when a plurality of recessed portions are provided on the opposing surface to the flywheel of the cover portion, strength of the cover portion is secured by ribs provided between the adjacent recessed portions.

A sixth aspect of the present invention is the flywheel housing according to the fifth aspect of the present invention, wherein a surface between an outer surface of the rib and the bottom surface of the recessed portion is a curved surface.

According to the sixth aspect of the present invention, since a surface between the outer surface of the rib and the bottom surface of the recessed portion is a curved surface, a worker can more readily touch a surface of the rib when placing a hand in the recessed portion.

A seventh aspect of the present invention is the flywheel housing according to the fifth or sixth aspect of the present invention, wherein a tip in an extending direction of the rib is positioned on the edge of the opening portion.

According to the seventh aspect of the present invention, due to the tip in the extending direction of the rib being positioned on the edge of the opening portion, access from the edge of the opening portion to the recessed portion along the rib becomes easier.

An eighth aspect of the present invention is the flywheel housing according to any one of the fifth to seventh aspects of the present invention, wherein a width of the rib becomes narrower in an extending direction.

According to the eighth aspect of the present invention, by making the width of the rib narrower in the extending direction, a reinforcement effect can be produced by securing a width of a root of the rib and, at the same time, a width of the recessed portion widens toward the edge of the opening portion and enables a hand to be more readily inserted to the recessed portion from the opening portion.

A ninth aspect of the present invention is the flywheel housing according to the first aspect of the present invention, wherein the main body portion has a support portion which is provided on an upper part of the main body portion and which supports another member, and the support portion includes a foundation portion which extends upward from the upper part of the main body portion and a pedestal portion which is provided on top of the foundation portion and which extends to a side of the cover portion while avoiding the cover portion.

According to the ninth aspect of the present invention, since the pedestal portion of the support portion extends out to the side of the cover portion while avoiding the cover portion, a sufficient pedestal area can be secured while avoiding interference with the cover portion.

A tenth aspect of the present invention is the flywheel housing according to the ninth aspect of the present invention, wherein a tip in the extending direction of the pedestal portion is positioned closer to a side of a front surface of the cover portion than a junction surface between the main body portion and the cover portion and closer to a side of the main body portion than the front surface of the cover portion.

According to the tenth aspect of the present invention, since the tip in the extending direction of the pedestal portion is positioned closer to a side of the front surface of the cover portion than the junction surface between the main body portion and the cover portion and closer to a side of the main body portion than the front surface of the cover portion, a sufficient pedestal area can be secured while preventing the pedestal portion from protruding beyond the front surface of the cover portion.

An eleventh aspect of the present invention is the flywheel housing according to the ninth or tenth aspect of the present invention, wherein the support portion has a reinforcing rib that is connected to at least the foundation portion.

According to the eleventh aspect of the present invention, the foundation portion is reinforced by the reinforcing rib.

A twelfth aspect of the present invention is the flywheel housing according to the eleventh aspect of the present invention, wherein the reinforcing rib is inclined, from the foundation portion toward the pedestal portion, in a direction of separation from a hoisting hook that is connected to the engine.

According to the twelfth aspect of the present invention, since the reinforcing rib is inclined, from the foundation portion toward the pedestal portion, in a direction of separation from the hoisting hook, the pedestal portion does not get in the way when hanging a hoisting member on the hoisting hook and hoisting the engine.

A thirteenth aspect of the present invention is the flywheel housing according to any one of the ninth to twelfth aspects of the present invention, wherein the engine and a member connected to the engine are not provided at positions that overlap with an upper surface of the pedestal portion when viewed from above the engine.

According to the thirteenth aspect of the present invention, since the engine and the member connected to the engine are not arranged above the pedestal portion, a degree of freedom of a position of connection of another member that is mounted to the pedestal portion increases.

A fourteenth aspect of the present invention is the flywheel housing according to any one of the ninth to thirteenth aspects of the present invention, wherein the pedestal portion is provided at a position separated from a hoisting hook that is connected to the engine when viewed from above the engine.

According to the fourteenth aspect of the present invention, since the pedestal portion and the hoisting hook of the engine are separated from each other, the pedestal portion does not get in the way when hanging a hoisting member on the hoisting hook and hoisting the engine.

A fifteenth aspect of the present invention is the flywheel housing according to any one of the ninth to fourteenth aspects of the present invention, the flywheel housing including two of the support portions, wherein the two support portions are provided at symmetrical positions with respect to the output shaft when viewed from above the engine.

According to the fifteenth aspect of the present invention, by providing the two support portions at symmetrical positions with respect to the output shaft when viewed from above the engine, a vibration around the output shaft of the engine can be effectively suppressed.

A sixteenth aspect of the present invention is the flywheel housing according to any one of the ninth to fifteenth aspects of the present invention, wherein the support portion is provided at a position that overlaps with the output shaft when viewed from above the engine.

According to the sixteenth aspect of the present invention, by providing the support portion at a position that overlaps with the output shaft when viewed from above the engine, a vibration around the output shaft of the engine can be effectively suppressed even with one support portion.

A seventeenth aspect of the present invention is an engine equipped with a flywheel housing that houses a flywheel coupled to an output shaft of the engine, the flywheel housing including: a main body portion which is arranged on the engine side of the flywheel and which houses the flywheel; and a cover portion which is arranged on an opposite side of the flywheel to the engine, and which is connected to the main body portion, and moreover which has an opening portion with an inner diameter that is smaller than an outer diameter of the flywheel, wherein the cover portion is provided with a recessed portion that is recessed in a direction of separation from the flywheel on an opposing surface to the flywheel in a peripheral portion of an edge of the opening portion.

According to the seventeenth aspect of the present invention, since the recessed portion is provided on an opposing surface to the flywheel in a peripheral portion of an edge of the opening portion of the cover portion, a gap is formed between the cover portion and the flywheel in the peripheral portion of the edge of the opening portion and workability is improved by the gap.

An eighteenth aspect of the present invention is the engine according to the seventeenth aspect of the present invention, wherein the main body portion has a support portion which is provided on an upper part of the main body portion and which supports another member, and the support portion includes a foundation portion which extends upward from the upper part of the main body portion and a pedestal portion which extends to a side of the cover portion while avoiding the cover portion.

According to the eighteenth aspect of the present invention, since the pedestal portion of the support portion extends out to the side of the cover portion while avoiding the cover portion, a sufficient pedestal area can be secured while avoiding interference with the cover portion.

According to the present invention, a flywheel housing capable of suppressing an increase in size of an engine and increasing workability and an engine equipped with the flywheel housing can be provided.

DESCRIPTION OF THE PREFERRED EMBODIMENTS

Figure 1:
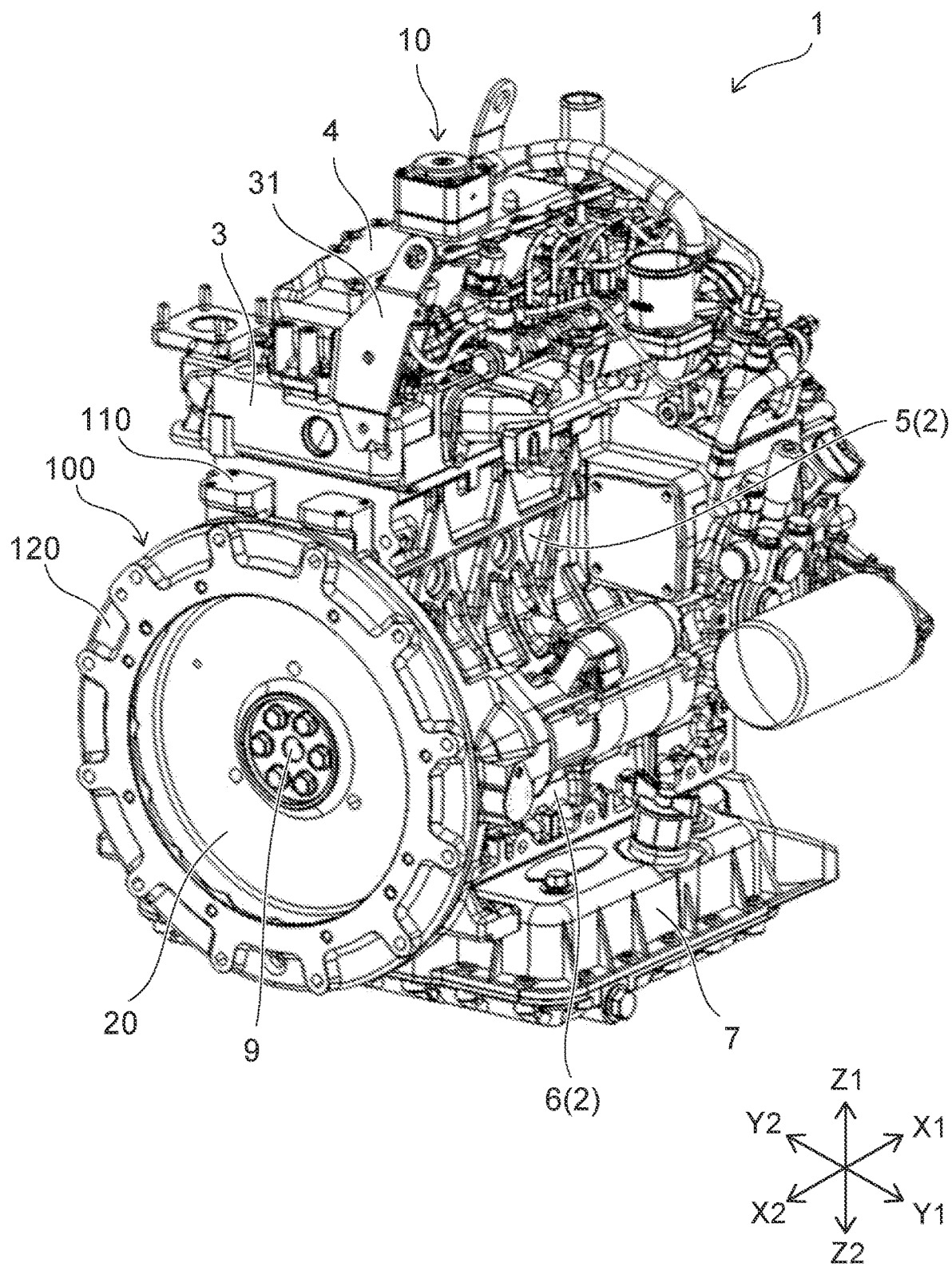
FIG. 1 is a perspective view showing an engine equipped with a flywheel housing according to an embodiment of the present invention.

Hereinafter, embodiments of the present invention will be described with reference to drawings.

Although the embodiments described below are preferred specific examples of the present invention and may be subject to various technically preferable limitations, the scope of the present invention is not limited to these aspects unless a description that specifically limits the present invention is provided below. In addition, similar components in the drawings will be denoted by same reference signs and detailed descriptions will be omitted when appropriate to do so.

FIG. 1 is a perspective view showing an engine equipped with a flywheel housing according to an embodiment of the present invention.

An engine 1 shown in FIG. 1 is an internal-combustion engine that is, for example, an industrial diesel engine. For example, the engine 1 is a supercharging high-output multiple cylinder engine such as a three-cylinder engine or four-cylinder engine with a turbocharger. For example, the engine 1 is mounted to industrial machinery such as construction machinery or agricultural machinery. In addition, the engine 1 may constitute a hybrid drive apparatus by being combined with a drive charging power battery and a drive electric motor.

The engine 1 includes a cylinder block 2, a cylinder head 3, a head cover 4, an oil pan 7, a blow-by gas treatment device 10, and a flywheel 20 housed in a flywheel housing 100. Note that, in the present embodiment, an axial direction of a crankshaft 9 that is an output shaft of the engine 1 will be designated X directions, one direction (lateral direction) of the directions orthogonal to the X directions will be designated Y directions, and a direction (height direction) orthogonal to both the X direction and the Y direction will be designated Z directions. In addition, one of the X directions (toward front of the engine 1) will be designated X1, the other (toward rear of the engine 1) will be designated X2, one of the Y directions will be designated Y1, the other will be designated Y2, one of the Z directions (toward above the engine 1) will be designated Z1, and the other (toward below the engine 1) will be designated Z2.

The cylinder head 3 is assembled onto the cylinder block 2. The head cover 4 is assembled onto the cylinder head 3. The cylinder block 2 has an upper cylinder 5 and a lower crankcase 6. The oil pan 7 is arranged in a lower part of the crankcase 6. A piston (not illustrated) is arranged inside the cylinder 5. The crankshaft 9 is arranged inside the crankcase 6. The piston is coupled to the crankshaft 9 via a con rod (not illustrated).

The blow-by gas treatment device 10 is provided inside the head cover 4. The blow-by gas treatment device 10 has a role of separating blow-by gas into oil and gas from which oil mist has been separated.

The flywheel 20 is coupled to a rear end (an X2-side end) of the crankshaft 9 that is one of the output shafts of the engine 1. The flywheel 20 rotates with the crankshaft 9 and makes a rotational operation of the engine 1 smooth due to a centrifugal force created by the rotation.

The flywheel housing 100 that houses the flywheel 20 is provided at a rear end (an X2-side end) of the cylinder block 2. The flywheel housing 100 has a main body portion 110 and a cover portion 120. The main body portion 110 has a housing portion 111 (refer to FIG. 2) that houses the flywheel 20 and is fastened to the cylinder block 2 by, for example, a bolt. When the flywheel 20 is housed in the housing portion 111, the main body portion 110 is arranged so as to cover a side (X1 side) of the cylinder block 2 of the flywheel 20.

The cover portion 120 is attached to the main body portion 110 so as to oppose the main body portion 110. For example, the cover portion 120 is attached to the X2 side of the main body portion 110 by a bolt. Due to the cover portion 120 being attached to the main body portion 110, the cover portion 120 is arranged so as to cover an opposite side (X2 side) to the cylinder block 2 of the flywheel 20. An opening portion 125 (refer to FIG. 2) is provided at the center of the cover portion 120. A torque of the flywheel 20 or, in other words, a torque of the engine 1 is extracted to the outside via the opening portion 125.

Figure 2:
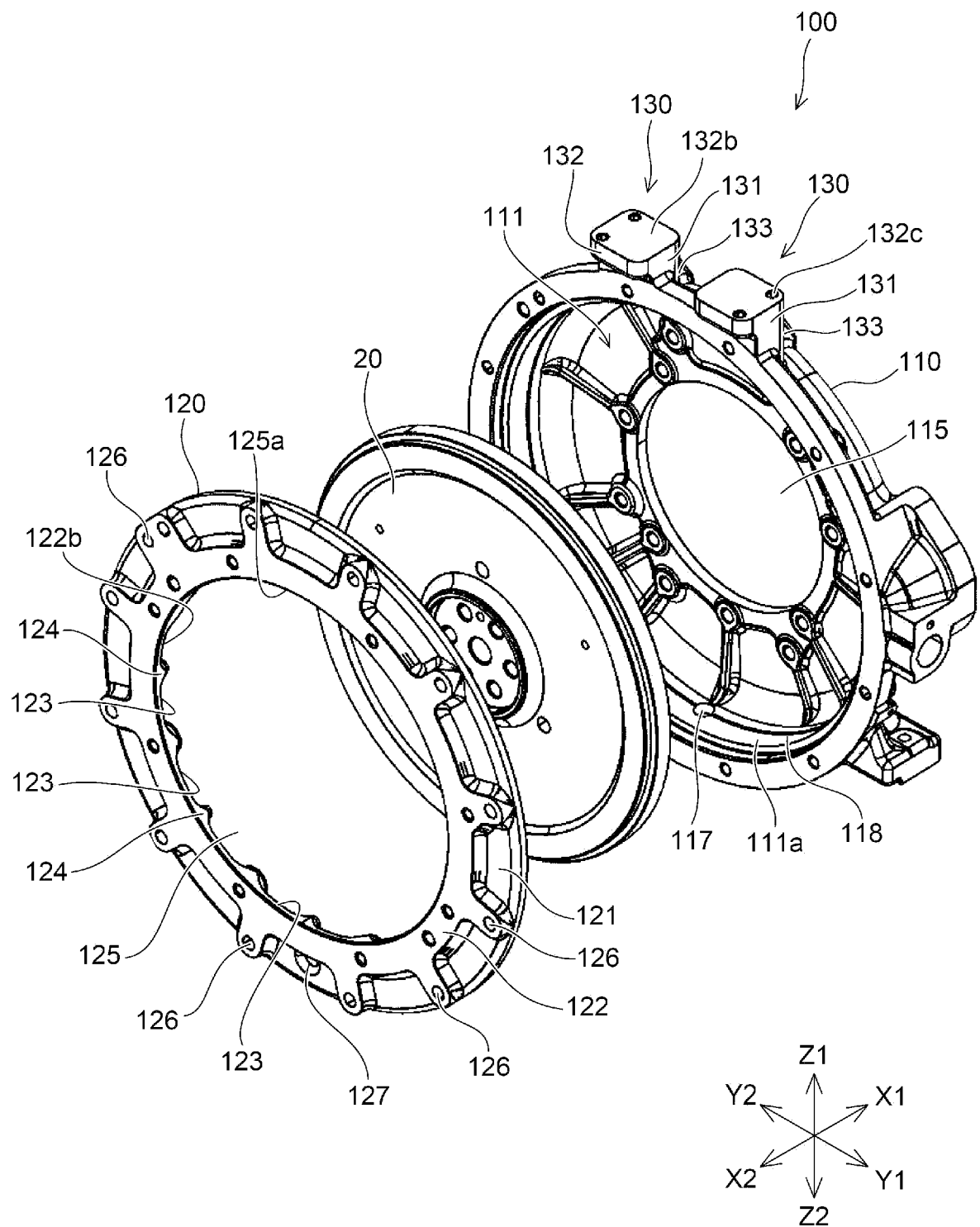
FIG. 2 is an exploded perspective view of the flywheel housing according to the present embodiment.

FIG. 2 is an exploded perspective view of the flywheel housing according to the present embodiment.

The flywheel housing 100 has the bowl-shaped main body portion 110 and the toric cover portion 120. The housing portion 111 that houses the flywheel 20 is provided on the inside of the main body portion 110 provided in a bowl shape. An inner diameter of the housing portion 111 is larger than an outer diameter of the flywheel 20. A hole 115 is provided in a central part (a central part of a bottom portion of the bowl shape) of the main body portion 110. By attaching the main body portion 110 to the cylinder block 2, a state is created where an end of the crankshaft 9 is positioned at a center of the hole 115.

In a state where the main body portion 110 is attached to a rear end of the cylinder block 2, the flywheel 20 is coupled to the crankshaft 9. The flywheel 20 is housed in the housing portion 111 and coupled to the crankshaft 9 that is positioned in the hole 115. When coupling the flywheel 20 to the rear end of the crankshaft 9, the flywheel 20 may be fixed via a coupling member (for example, a coupling flange) attached to the rear end of the crankshaft 9.

The cover portion 120 is attached to the X2 side of the main body portion 110 in a state where the flywheel 20 is attached to the housing portion 111 of the main body portion 110. The cover portion 120 is attached to the main body portion 110 so as to cover the housing portion 111 of the main body portion 110. An attaching hole 126 is provided in a peripheral portion of the toric cover portion 120 and the cover portion 120 is fastened to the main body portion 110 by a bolt (not illustrated) via the attaching hole 126.

The opening portion 125 is provided at a central part of the cover portion 120. An inner diameter of the opening portion 125 is smaller than the outer diameter of the flywheel 20. Accordingly, when the cover portion 120 is attached to the main body portion 110, an outer peripheral portion of the flywheel 20 is to be covered by the cover portion 120. The central portion of the flywheel 20 can be accessed from outside via the opening portion 125. A drive object device that uses the torque of the engine 1 can obtain the torque of the flywheel 20 via the opening portion 125 of the cover portion 120.

Configuration of Cover Portion

Next, a configuration of the cover portion 120 of the flywheel housing 100 will be described.

Figure 3:
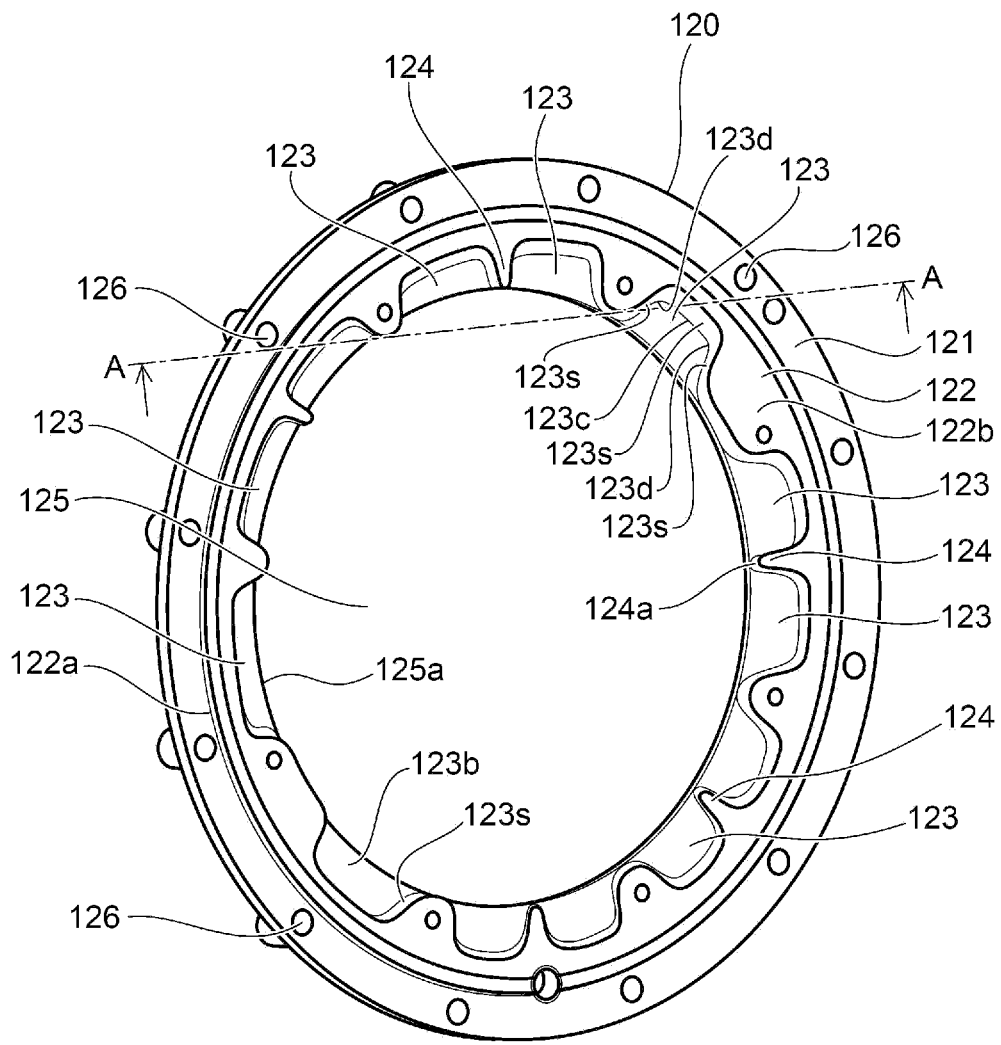
FIG. 3 is a perspective view illustrating a cover portion.

FIG. 3 is a perspective view illustrating a cover portion. FIG. 3 represents a perspective view when an X1 side of the cover portion 120 is viewed in an X2 orientation.

Figure 4:
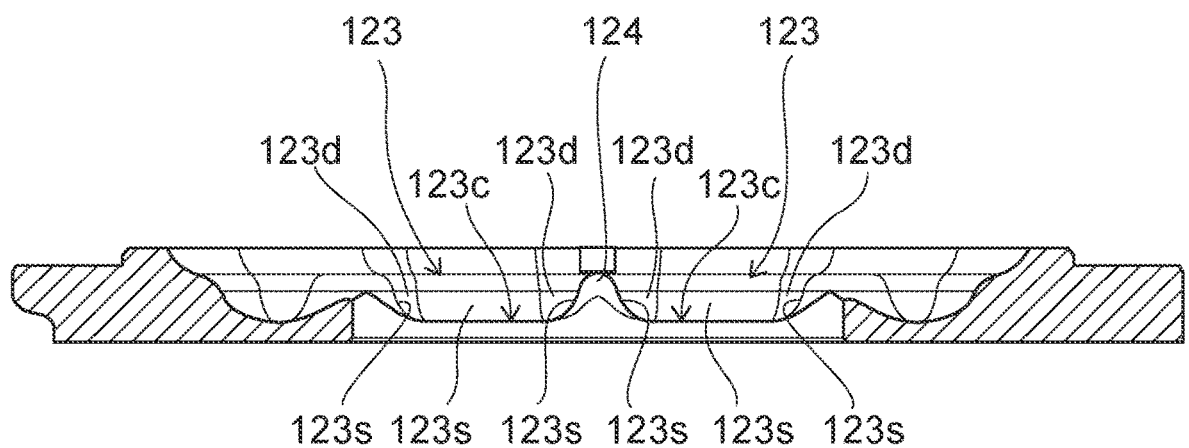
FIG. 4 is a partial sectional view of the cover portion.

FIG. 4 is a partial sectional view of the cover portion. FIG. 4 shows a sectional view taken along line A-A in FIG. 3.

The cover portion 120 has an annular outer circumferential portion 121 and an inner circumferential portion 122 provided on an inner side of the outer circumferential portion 121. The inner circumferential portion 122 is a portion between the outer circumferential portion 121 and the opening portion 125. A plurality of the attaching holes 126 are provided at predetermined intervals in the outer circumferential portion 121. A protruding portion 122a that extends on a circumference is provided in the inner circumferential portion 122. The protruding portion 122a is used to align center positions when attaching the cover portion 120 to the main body portion 110.

An opposing surface 122b to the flywheel 20 in the inner circumferential portion 122 is provided with a recessed portion 123 that is recessed in a direction of separation from the flywheel. Since a bottom surface 123b of the recessed portion 123 is set back toward the X2 side from the opposing surface 122b, a gap is formed between the cover portion 120 and the flywheel 20 at the position of the recessed portion 123. The gap enables a work space when accessing the flywheel 20 via the opening portion 125 from the X2 side of the cover portion 120 to be secured.

For example, when a worker wishes to clean a portion of the flywheel 20 that is covered by the cover portion 120 via the opening portion 125 or clean the opposing surface 122b to be a rear side of the cover portion 120 in a state where the cover portion 120 is attached to the main body portion 110, the worker can more easily insert a hand by using the gap formed by the recessed portion 123. When the recessed portion 123 is not provided, the gap between the cover portion 120 and the flywheel 20 is narrow and it is difficult to insert a hand between a rear side of the cover portion 120 (the opposing surface 122b to the flywheel 20) and the flywheel 20 from the opening portion 125. In the present embodiment, a gap is formed between the rear side of the cover portion 120 and the flywheel 20 by the recessed portion 123 and the gap makes it easier to insert a hand into this portion from the opening portion 125 and perform a task such as wiping with a waste cloth or the like.

A plurality of the recessed portions 123 are preferably provided on the opposing surface 122b of the cover portion 120. The plurality of the recessed portions 123 are arranged along an edge 125a of the opening portion 125. Accordingly, workability in a wide range of the opposing surface 122b of the cover portion 120 can be improved.

A rib 124 is provided between two adjacent recessed portions 123 among the plurality of recessed portions 123. In other words, the plurality of the recessed portions 123 and a plurality of the ribs 124 are respectively alternately arranged. While providing the recessed portions 123 makes the cover portion 120 thinner, a strength of the cover portion 120 is secured by providing the ribs 124.

The recessed portions 123 are arranged so that the edge 125a of the opening portion 125 is positioned on the bottom surface 123b of the recessed portions 123. In other words, the recessed portions 123 are arranged along the edge 125a of the opening portion 125. Accordingly, the bottom surface 123b of the recessed portions 123 is to continue from the edge 125a of the opening portion 125 and a state is created where there is no wall on the side of the edge 125a in the recessed portions 123. Accordingly, the opposing surface 122b of the cover portion 120 can be readily accessed from the edge 125a of the opening portion 125.

In addition, when the ribs 124 are provided between the plurality of adjacent recessed portions 123, a tip 124a in an extending direction of the ribs 124 is positioned at the edge 125a of the opening portion 125. By positioning the tip 124a of the ribs 124 on the edge 125a of the opening portion 125, access from the edge 125a of the opening portion 125 to the recessed portion 123 along the ribs 124 becomes easier.

In this case, a curved surface 123c is preferably provided between a side surface 123s and the bottom surface 123b of the recessed portions 123. In addition, a curved surface 123d is preferably provided between adjacent side surfaces 123s of the recessed portions 123. In this manner, due to the surfaces between the surfaces of the recessed portion 123 being curved surfaces 123c and 123d, a worker can more readily touch an entire surface of the recessed portion 123 when placing a hand in the recessed portion 123. In other words, due to a surface between adjacent side surfaces 123s and a corner part between the side surface 123s and the bottom surface 123b being relatively large R-surfaces, a hand can be readily brought into contact with the corner part and incomplete wiping can be suppressed. Note that the recessed portion 123 may be solely constituted of a recessed curved surface (a surface that does not include a flat surface).

In addition, as shown in FIG. 4, a surface between an outer surface of the rib 124 and the bottom surface 123b of the recessed portion 123 is preferably a curved surface. The outer surface of the rib 124 corresponds to a part of the side surface 123s of the recessed portion 123. In the present embodiment, as shown in FIG. 4, the rib 124 forms a chevron (for example, a normal distribution) that is bilaterally symmetrical (line-symmetric with respect to the X direction) on a plane represented by the X direction and the Z direction. Due to a surface between the outer surface of the rib 124 (in other words, a part of the side surface 123s of the recessed portion 123) and the bottom surface 123b of the recessed portion 123 being a curved surface, a worker can more readily touch a surface of the rib 124 when placing a hand in the recessed portion 123.

Preferably, a width of the rib 124 (a length in the Y direction in FIG. 4) becomes narrower in an extending direction (a direction toward the X1 side from the X2 side in FIG. 4). Accordingly, a reinforcement effect can be produced by securing a width of a root of the rib 124 and, at the same time, a width of the recessed portion 123 widens toward the edge 125a and enables a hand to be more readily inserted to the recessed portion 123 from the opening portion 125.

Drain Mechanism

Next, a drain mechanism of the flywheel housing 100 will be described.

In the engine 1, a sealing property is required of joint portions between members such as between the cylinder block 2 and the cylinder head 3 and between the cylinder head 3 and the head cover 4. One method of testing a sealing property is a submersion test. In a submersion test of the engine 1, the flywheel housing 100 is covered in order to prevent water from entering the flywheel housing 100. However, a certain amount of water may penetrate into the flywheel housing 100 even when a cover is in place. After the submersion test, the water must be discharged from inside the flywheel housing 100. The flywheel housing 100 according to the present embodiment is equipped with a drain mechanism for discharging such water.

Figure 5:
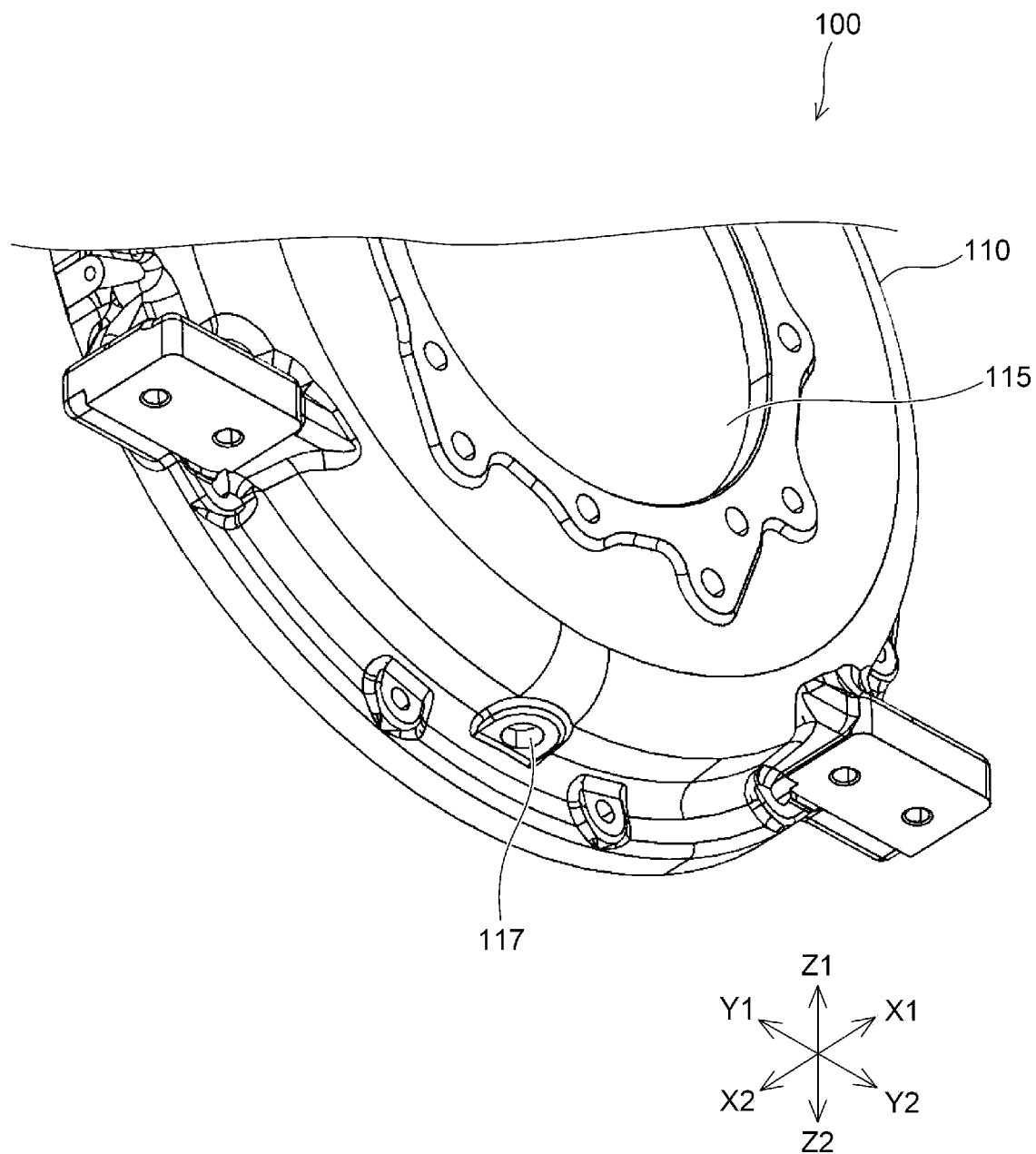
FIG. 5 is a first perspective view illustrating a part of a main body portion.

FIG. 5 is a first perspective view illustrating a part of the main body portion. FIG. 5 represents a perspective view when a lower part on the X1 side of the main body portion 110 is viewed obliquely upward.

Figure 6:
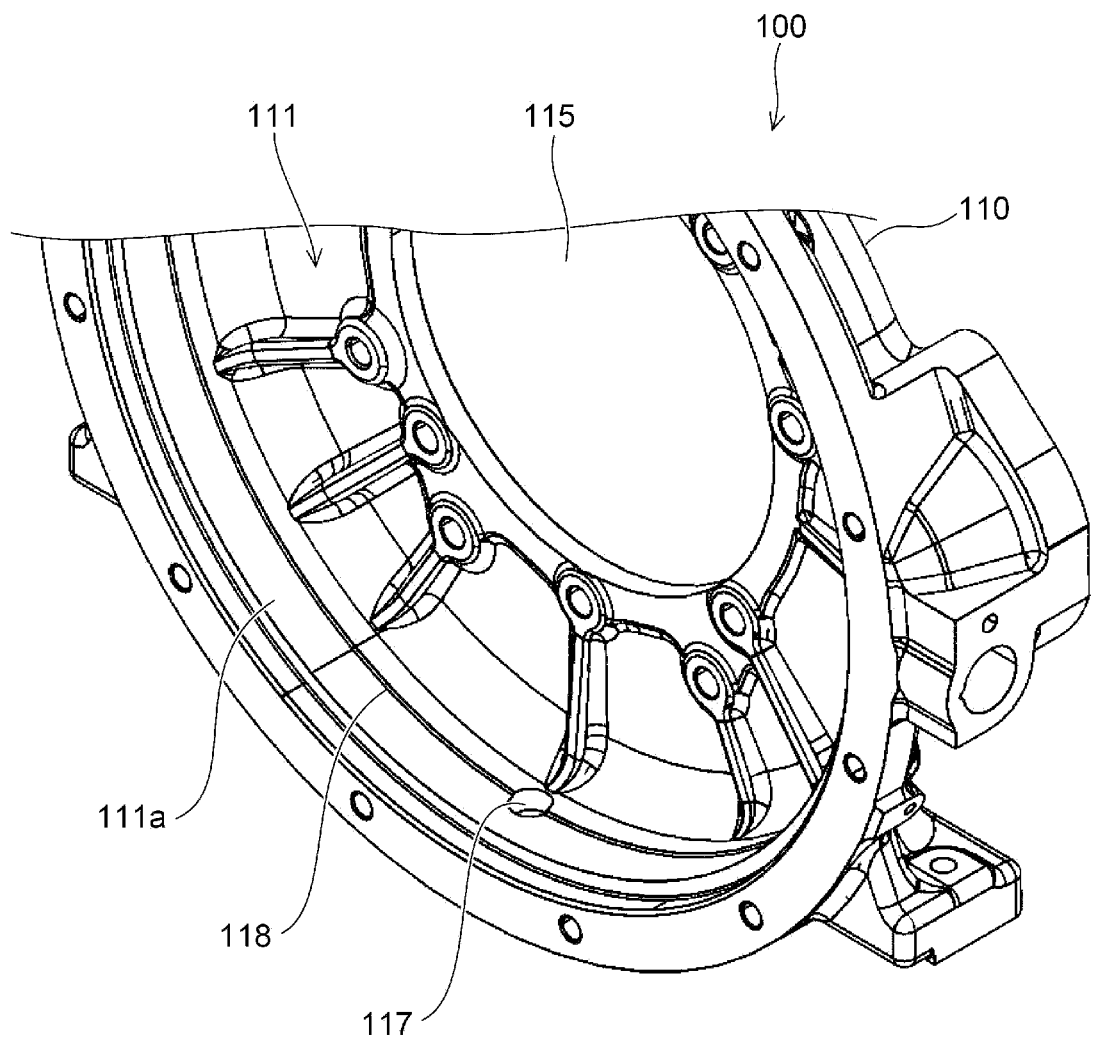
FIG. 6 is a second perspective view illustrating a part of the main body portion.
Figure 6:
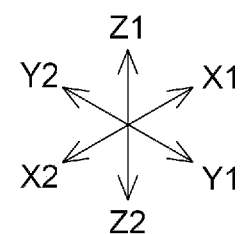

FIG. 6 is a second perspective view illustrating a part of the main body portion. FIG. 6 represents a perspective view when a lower part on the X2 side of the main body portion 110 is viewed obliquely downward.

In the flywheel housing 100, a first through-hole 117 is provided in a lower part of the housing portion 111 of the main body portion 110. The first through-hole 117 is provided so as to open downward at a bottommost position in the housing portion 111 that is provided in a bowl shape of the main body portion 110. Due to the first through-hole 117 being provided in the main body portion 110, water can be discharged to the outside from the housing portion 111 via the first through-hole 117.

A stepped portion 118 is provided in a circumferential direction on an inner circumferential surface 111a of the housing portion 111 in the main body portion 110. The stepped portion 118 is connected to the first through-hole 117. In other words, the first through-hole 117 is positioned midway along the stepped portion 118 that is continuously provided in the circumferential direction. By providing the stepped portion 118, water adhered to the inner circumferential surface 111a of the housing portion 111 is guided to a lower part of the inner circumferential surface 111a along the stepped portion 118. In addition, water guided to the lower part of the inner circumferential surface 111a is to be discharged to the outside of the main body portion 110 via the first through-hole 117 to be connected to the stepped portion 118. By providing the stepped portion 118, water in the housing portion 111 is efficiently directed to the first through-hole 117 by being guided on the inner circumferential surface 111a along the stepped portion 118 and discharged to the outside.

Figure 7:
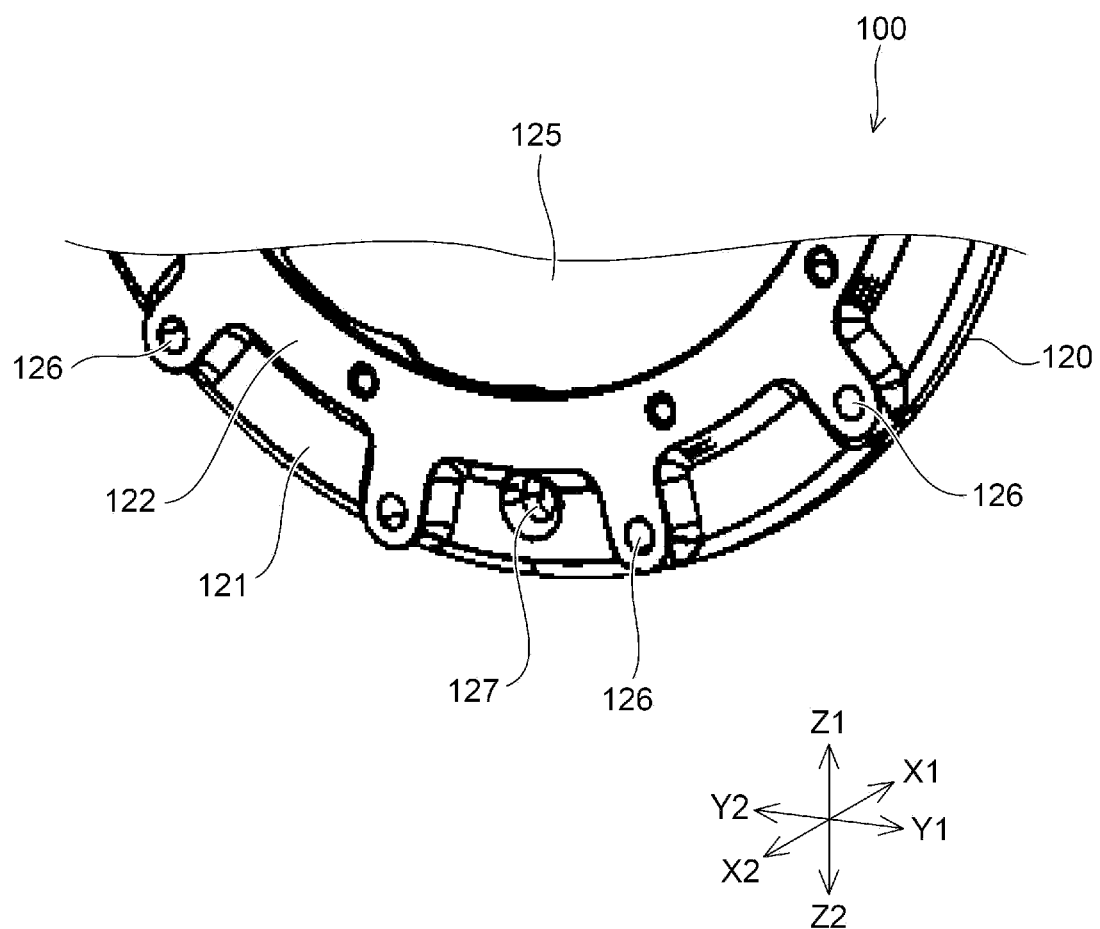
FIG. 7 is a perspective view illustrating a part of the cover portion.

FIG. 7 is a perspective view illustrating a part of the cover portion. FIG. 7 represents a perspective view when the X2 side of the cover portion 120 is viewed in an X1 orientation.

In the flywheel housing 100, a second through-hole 127 is provided in the inner circumferential portion 122 that is positioned in a lower part of the opening portion 125 of the cover portion 120. For example, the second through-hole 127 is provided between the outer circumferential portion 121 and the inner circumferential portion 122 of the cover portion 120 so as to penetrate the cover portion 120 from a rear surface (X1 side) toward a front surface (X2 side). Due to the second through-hole 127 being provided in the lower part of the cover portion 120, water can be discharged to the outside from the housing portion 111 via the second through-hole 127.

Figure 8:
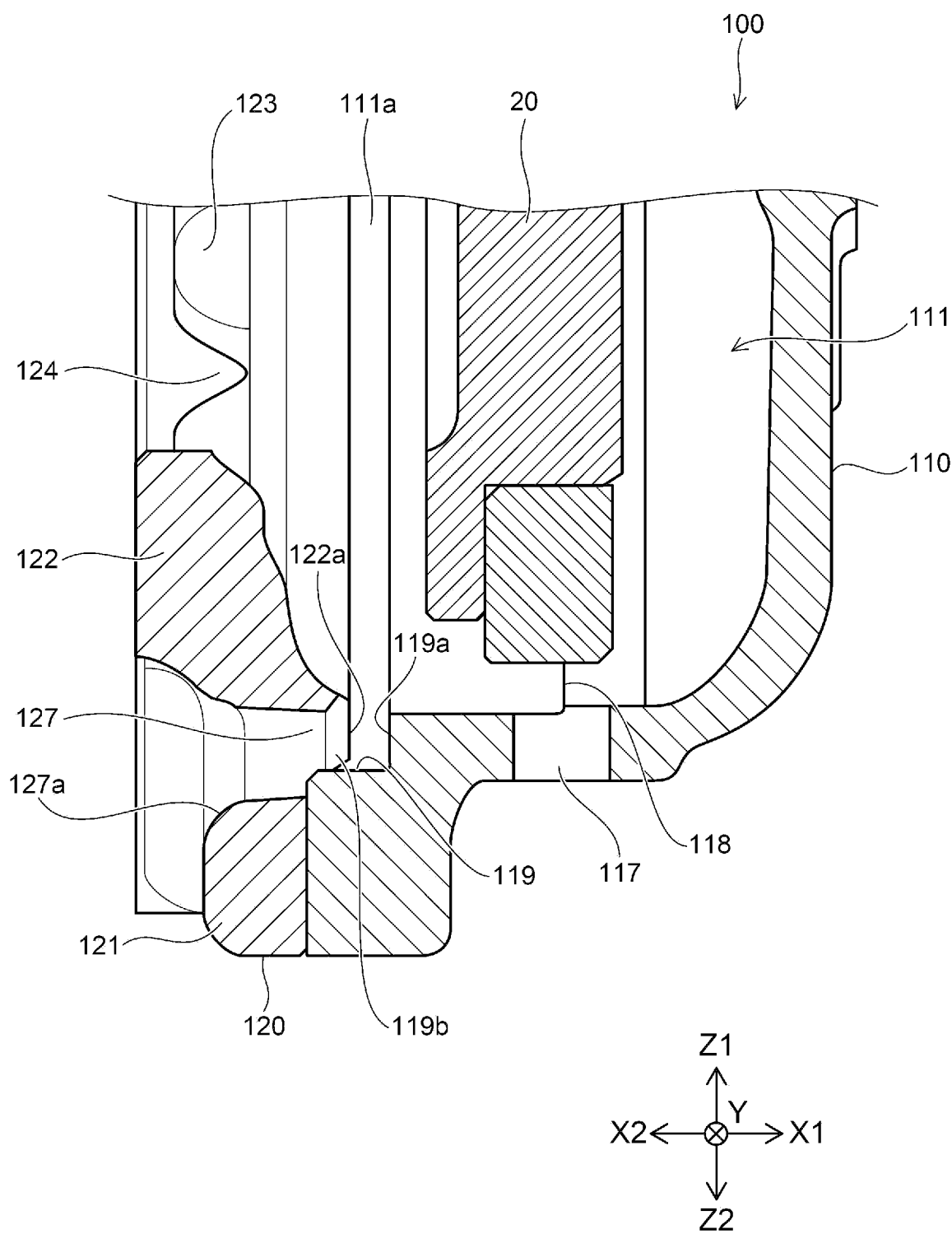
FIG. 8 is a sectional view illustrating a part of the flywheel housing.

FIG. 8 is a sectional view illustrating a part of the flywheel housing. FIG. 8 represents a sectional view (a sectional view as viewed in the Y2 direction) of a lower part of the flywheel housing.

When the cover portion 120 is attached to the main body portion 110 in a state where the flywheel 20 is housed in the housing portion 111, the protruding portion 122a of the cover portion 120 engages with the inner circumferential surface 111a of the main body portion 110 and the cover portion 120 and the main body portion 110 are attached in a state where center positions thereof are aligned.

A groove portion 119 is provided in a circumferential direction on the inner circumferential surface 111a of the main body portion 110. In the present embodiment, the groove portion 119 is constructed between a wall portion 119a provided in a circumferential direction on the inner circumferential surface 111a of the main body portion 110 and the protruding portion 122a of the cover portion 120. In other words, the groove portion 119 is constructed by attaching the cover portion 120 to the main body portion 110. The groove portion 119 is connected to the second through-hole 127 of the cover portion 120. Accordingly, water inside the housing portion 111 enters the groove portion 119 to be guided to the second through-hole 127 and can be efficiently discharged from the second through-hole 127.

In addition, a tapered portion 119b may be provided between the second through-hole 127 and the groove portion 119. By providing the tapered portion 119b, water guided by the groove portion 119 flows along the tapered portion 119b and more readily flows to the second through-hole 127.

The second through-hole 127 preferably has a gradual increase portion 127a in which an inner diameter of the second through-hole 127 gradually increases toward the front surface of the cover portion 120 (from the X1 side toward the X2 side). The gradual increase portion 127a may be configured so that the inner diameter of the second through-hole 127 increases in stages or increases continuously. In addition, the gradual increase portion 127a may be provided so that the inner diameter of the second through-hole 127 increases symmetrically or asymmetrically with respect to a central axis of the second through-hole 127. For example, a lower side (Z2 side) of the inner diameter of the second through-hole 127 may increase more than an upper side (Z1 side). Accordingly, water guided by the second through-hole 127 more readily flows in a direction of discharge via the gradual increase portion 127a and a reverse flow of the water is suppressed.

Structure of Support Portion

Next, a structure of a support portion of the flywheel housing 100 will be described.

Figure 9:
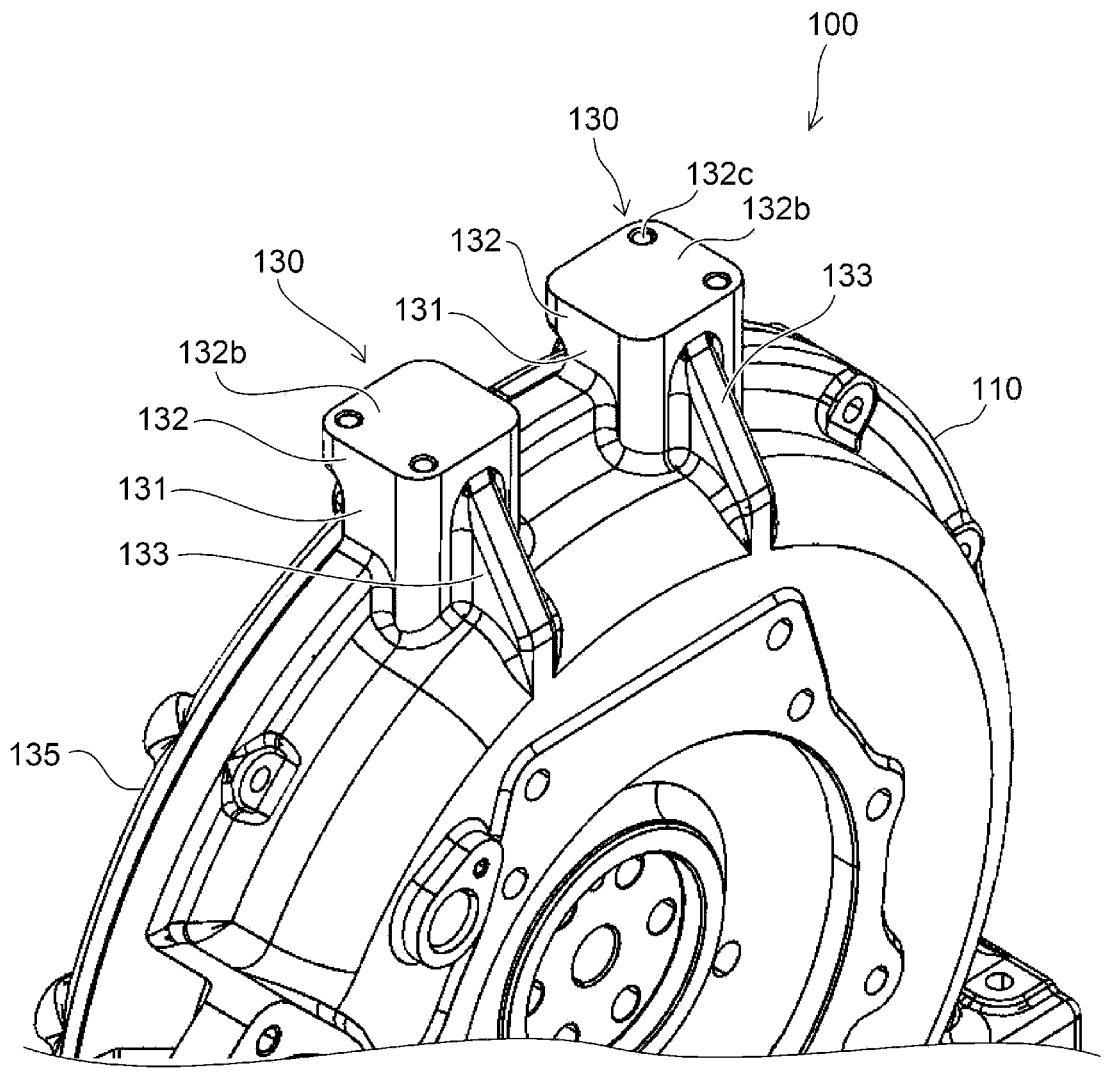
FIG. 9 is a perspective view illustrating a support portion provided in the flywheel housing.
Figure 9:
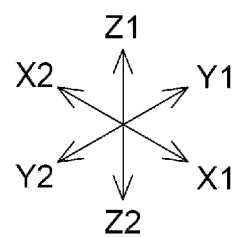

FIG. 9 is a perspective view illustrating the support portion provided in the flywheel housing.

Figure 10:
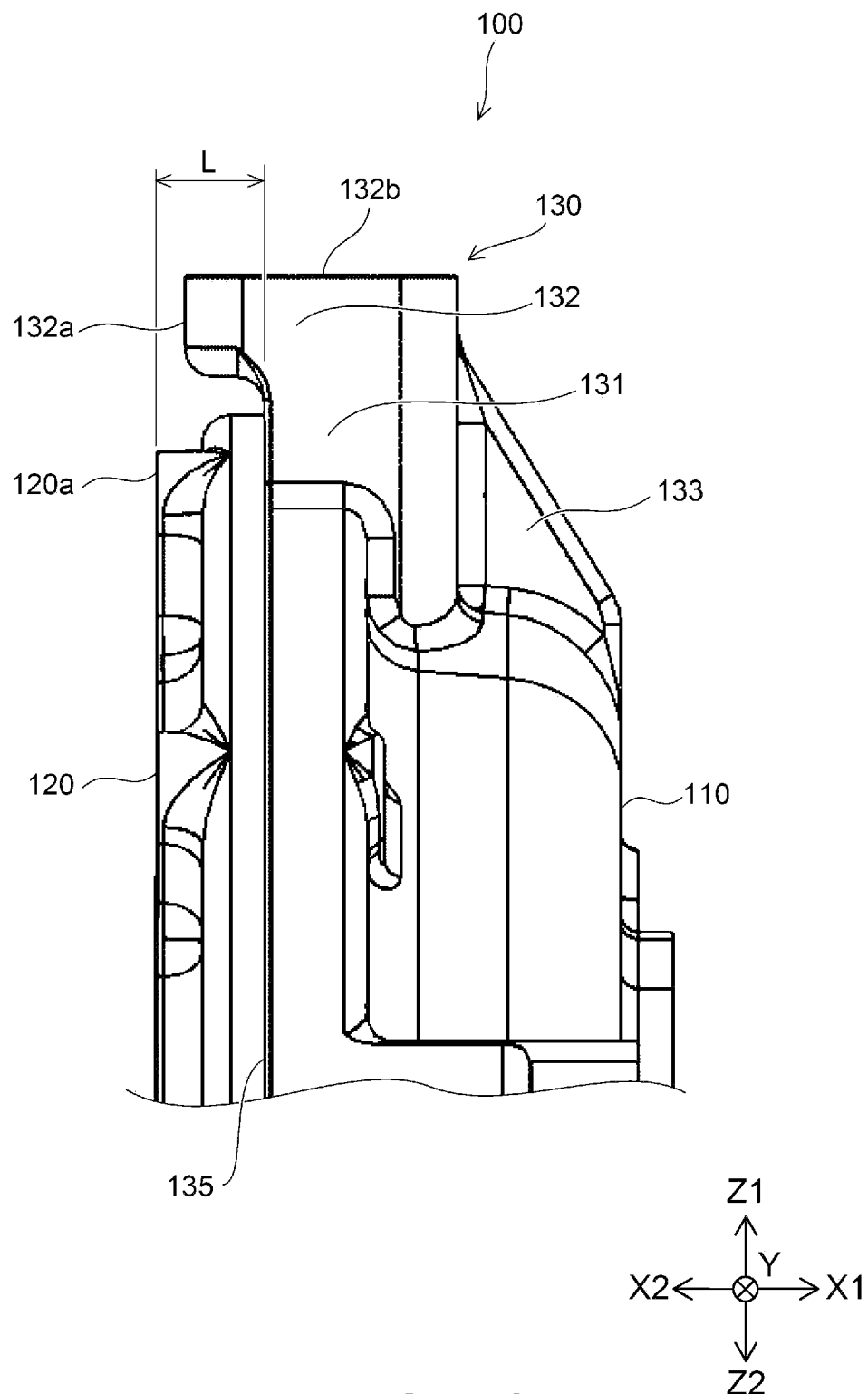
FIG. 10 is a side view illustrating the support portion provided in the flywheel housing.

FIG. 10 is a side view illustrating the support portion provided in the flywheel housing. FIG. 10 represents a side view of the upper part of the flywheel housing.

In the flywheel housing 100 according to the present embodiment, a support portion 130 that supports another member is provided in an upper part of the main body portion 110. An example of the other member to be supported by the support portion 130 includes a vibration suppression device (a vibration damper, an auxiliary bar, or the like) of the engine 1.

The support portion 130 has a foundation portion 131 that extends upward (Z1 side) from the upper part of the main body portion 110 and a pedestal portion 132 provided on top of the foundation portion 131. An upper surface of the pedestal portion 132 is a flat pedestal surface 132b that is provided with, for example, a screw hole 132c. Other members are fixed to the support portion 130 using the screw hole 132c.

The pedestal portion 132 is provided on top of the foundation portion 131 so as to extend to a side of the cover portion 120 (X2 side) while avoiding the cover portion 120. In other words, while the foundation portion 131 of the support portion 130 is provided toward above the main body portion 110, the pedestal portion 132 is provided so as to bulge out to the side of the cover portion 120 from above the main body portion 110. Accordingly, a sufficient area (pedestal area) of the pedestal surface 132b can be secured while avoiding interference by the support portion 130 with the cover portion 120.

A tip 132a in an extending direction of the pedestal portion 132 is positioned closer to a side (X2 side) of the front surface 120a of the cover portion 120 than a junction surface 135 between the main body portion 110 and the cover portion 120 and closer to the side (X1 side) of the main body portion than the front surface 120a of the cover portion 120 (refer to a range L shown in FIG. 10). Accordingly, the pedestal portion 132 can be prevented from protruding to the X2 side beyond the front surface 120a of the cover portion 120 and a sufficient pedestal area can be secured.

The support portion 130 preferably has a reinforcing rib 133 connected to at least the foundation portion 131. In the present embodiment, the reinforcing rib 133 is provided between a surface on the X1 side of the foundation portion 131 and the main body portion 110. Accordingly, a strength of the foundation portion 131 is reinforced.

In addition, when viewed from above the engine 1, the engine 1 and members connected to the engine 1 are preferably not provided at positions that overlap with an upper surface of the pedestal portion 132 (the pedestal surface 132b). Due to the engine 1 and the members connected to the engine 1 not being arranged above the pedestal portion 132, a degree of freedom of positions of connection of the other members attached to the pedestal portion 132 increases.

As an example, the cylinder head 3 of the engine 1 is provided with a hoisting hook 31 (refer to FIG. 1) to be used when hoisting the engine 1. When viewed from above the engine 1, the pedestal portion 132 is provided at a position separated from the hoisting hook 31 connected to the engine 1. Accordingly, when performing a task of hanging a hoisting member on the hoisting hook 31 and hoisting the engine 1, the pedestal portion 132 does not get in the way. In addition, the reinforcing rib 133 is inclined, from the foundation portion 131 toward the pedestal portion 132 (in other words, from the Z2 side toward the Z1 side), in a direction of separation (in other words, the X2 direction) from the hoisting hook 31. Accordingly, when performing a task of hanging a hoisting member on the hoisting hook 31 and hoisting the engine 1, the reinforcing rib 133 does not get in the way. The engine 1 and members to be connected to the engine 1 are preferably not arranged above the pedestal portion 132 even besides the hoisting hook 31.

One support portion 130 or two or more support portions 130 may be provided on the main body portion 110. For example, when two support portions 130 are provided, the two support portions 130 are preferably provided at symmetrical positions with respect to the crankshaft 9 that is an output shaft when viewed from above the engine 1. Due to the two support portions 130 being provided at symmetrical positions with respect to the crankshaft 9, vibration around the crankshaft 9 (vibration in a direction of rotation centered on the crankshaft 9) of the engine 1 can be effectively suppressed, with a damping device being attached to these support portions.

In addition, for example, when one support portion 130 is provided, the support portion 130 may be provided at a position that overlaps with the crankshaft 9 when viewed from above the engine 1. Accordingly, vibration around the crankshaft 9 (vibration in a direction of rotation centered on the crankshaft 9) of the engine 1 can be effectively suppressed in a similar manner to that described above.

According to the present embodiment described above, a flywheel housing 100 capable of suppressing an increase in size of an engine 1 and increasing workability and an engine 1 equipped with the flywheel housing 100 can be provided.

An embodiment of the present invention has been described above. However, the present invention is not limited to the embodiment described above and various modifications can be made without deviating from the scope of claims. A part of the components of the embodiment described above may be omitted or combined in any way so as to differ from the combination described above.

The invention claimed is:

1. A flywheel housing that houses a flywheel coupled to an output shaft of an engine, the flywheel housing comprising:
    a main body portion which is arranged on the engine side of the flywheel and which has a housing portion that houses the flywheel; and
    a cover portion which is arranged on an opposite side of the flywheel to the engine, and which is connected to the main body portion, and moreover which has an opening portion with an inner diameter that is smaller than an outer diameter of the flywheel, wherein
    the cover portion is provided with a recessed portion that is recessed in a direction of separation from the flywheel on an opposing surface to the flywheel in a peripheral portion of an edge of the opening portion, and
    the opposing surface is provided with a plurality of the recessed portions on a circumference in a periphery of the opening portion and a rib is provided between the plurality of adjacent recessed portions.

2. The flywheel housing according to claim 1, wherein the edge of the opening portion is positioned on a bottom surface of the recessed portion.

3. The flywheel housing according to claim 1, wherein a curved surface is provided between a side surface and the bottom surface of the recessed portion.

4. The flywheel housing according to claim 1, wherein a curved surface is provided between adjacent side surfaces of the recessed portion.

5. The flywheel housing according to claim 1, wherein a surface between an outer surface of the rib and a bottom surface of the recessed portion is a curved surface.

6. The flywheel housing according to claim 1, wherein a tip in an extending direction of the rib is positioned on the edge of the opening portion.

7. The flywheel housing according to claim 1, wherein a width of the rib becomes narrower in an extending direction.

8. A flywheel housing that houses a flywheel coupled to an output shaft of an engine, the flywheel housing comprising:
    a main body portion which is arranged on the engine side of the flywheel and which has a housing portion that houses the flywheel; and
    a cover portion which is arranged on an opposite side of the flywheel to the engine, and which is connected to the main body portion, and moreover which has an opening portion with an inner diameter that is smaller than an outer diameter of the flywheel, wherein the cover portion is provided with a recessed portion that is recessed in a direction of separation from the flywheel on an opposing surface to the flywheel in a peripheral portion of an edge of the opening portion, and the main body portion has a support portion which is provided on an upper part of the main body portion and which supports another member, and the support portion includes
- a foundation portion which extends upward from the upper part of the main body portion, and
- a pedestal portion which is provided on top of the foundation portion and which extends to a side of the cover portion while avoiding the cover portion.

9. The flywheel housing according to claim 8, wherein a tip in the extending direction of the pedestal portion is positioned closer to a side of a front surface of the cover portion than a junction surface between the main body portion and the cover portion and closer to a side of the main body portion than the front surface of the cover portion.

10. The flywheel housing according to claim 8, wherein the support portion has a reinforcing rib that is connected to at least the foundation portion.

11. The flywheel housing according to claim 10, wherein the reinforcing rib is inclined, from the foundation portion toward the pedestal portion, in a direction of separation from a hoisting hook that is connected to the engine.

12. The flywheel housing according to claim 8, wherein the engine and a member connected to the engine are not provided at positions that overlap with an upper surface of the pedestal portion when viewed from above the engine.

13. The flywheel housing according to claim 8, wherein the pedestal portion is provided at a position separated from a hoisting hook that is connected to the engine when viewed from above the engine.

14. The flywheel housing according to claim 8, comprising two of the support portions, wherein the two support portions are provided at symmetrical positions with respect to the output shaft when viewed from above the engine.

15. The flywheel housing according to claim 8, wherein the support portion is provided at a position that overlaps with the output shaft when viewed from above the engine.

16. An engine equipped with a flywheel housing that houses a flywheel coupled to an output shaft of the engine, the flywheel housing including:

a main body portion which is arranged on the engine side of the flywheel and which has a housing portion that houses the flywheel; and a cover portion which is arranged on an opposite side of the flywheel to the engine, and which is connected to the main body portion, and moreover which has an opening portion with an inner diameter that is smaller than an outer diameter of the flywheel, wherein the cover portion is provided with a recessed portion that is recessed in a direction of separation from the flywheel on an opposing surface to the flywheel in a peripheral portion of an edge of the opening portion, the main body portion has a support portion which is provided on an upper part of the main body portion and which supports another member, and the support portion includes
- a foundation portion which extends upward from the upper part of the main body portion, and
- a pedestal portion which is provided on top of the foundation portion and which extends to a side of the cover portion while avoiding the cover portion.

* * * * *